United States Patent
Cabeen et al.

(10) Patent No.: US 9,394,829 B2
(45) Date of Patent: Jul. 19, 2016

(54) SYSTEM AND METHOD FOR ALIGNING A GAS TURBINE ENGINE

(71) Applicant: Solar Turbines Incorporated, San Diego, CA (US)

(72) Inventors: Jack Harvey Cabeen, Lakeside, CA (US); Manuel Estevez, III, Chula Vista, CA (US); Edward William Sieveking, San Diego, CA (US); Bruno Enriquez Struck, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 643 days.

(21) Appl. No.: 13/785,733

(22) Filed: Mar. 5, 2013

(65) Prior Publication Data
US 2014/0250916 A1    Sep. 11, 2014

(51) Int. Cl.
*F02C 7/20*    (2006.01)
*F01D 25/28*    (2006.01)

(52) U.S. Cl.
CPC .  *F02C 7/20* (2013.01); *F01D 25/28* (2013.01); *F05D 2230/642* (2013.01); *F05D 2230/644* (2013.01); *Y10T 29/49229* (2015.01)

(58) Field of Classification Search
CPC ......... F01D 25/28; F01D 25/285; F02C 7/20; F02C 7/32; F05D 2230/642; F05D 2230/644; B64D 2027/262; B64D 2027/264
USPC ....................................... 248/554
See application file for complete search history.

(56) References Cited

U.S. PATENT DOCUMENTS

| | | | |
|---|---|---|---|
| 5,816,367 A * | 10/1998 | Lilja | B64F 5/0036 187/244 |
| 6,260,351 B1 | 7/2001 | Delano et al. | |
| 6,607,165 B1 | 8/2003 | Manteiga et al. | |
| 7,950,605 B2 | 5/2011 | Howard et al. | |
| 8,028,967 B2 | 10/2011 | Busekros et al. | |
| 2005/0081531 A1 | 4/2005 | Stretton et al. | |
| 2006/0107787 A1* | 5/2006 | Herlihy | F02C 7/32 74/650 |
| 2008/0187431 A1* | 8/2008 | Brown | F01D 25/28 415/1 |
| 2009/0056343 A1 | 3/2009 | Suciu et al. | |
| 2009/0173251 A1* | 7/2009 | Kalantari | F01D 25/285 104/93 |
| 2009/0314881 A1 | 12/2009 | Suciu et al. | |
| 2011/0073822 A1* | 3/2011 | Chen | B66F 5/04 254/93 R |

FOREIGN PATENT DOCUMENTS

GB    1433479 A    4/1976

OTHER PUBLICATIONS

Nonpublished U.S. Appl. No. 13/535,539, filed Jun. 28, 2012 in 21 pages.

* cited by examiner

*Primary Examiner* — Devon Kramer
*Assistant Examiner* — Kenneth J Hansen
(74) *Attorney, Agent, or Firm* — Procopio, Cory, Hargreaves & Savitch LLP

(57) ABSTRACT

A system and method for aligning a gas turbine engine. The system and method includes installing an alignment mount, determining whether the gas turbine engine is aligned and/or in a sufficiently aligned condition, and modifying a vertical position of the gas turbine engine at the alignment mount in response. The alignment mount includes an engine attachment, a ground attachment, and an expansion member configured to allow the engine attachment and the ground attachment to move relative to each other and maintain a load path therebetween.

16 Claims, 3 Drawing Sheets

SYSTEM AND METHOD FOR ALIGNING A GAS TURBINE ENGINE

TECHNICAL FIELD

The present disclosure generally pertains to a gas turbine engine mount, and is more particularly directed toward a system and method for mounting and leveling a turbine engine mounted to a gearbox.

BACKGROUND

Gas turbine systems include a rotor unit mounted to rotate inside a stationary external housing and generally have a gearbox that is mounted to the bearing housing at one end of the gas turbine engine. The gearbox is generally positioned adjacent the turbine engine and coupled in a manner to use power from the gas turbine engine to drive the gas turbine engine's accessories such as electrical generators, fluid pumps, and heat exchangers for cooling oil or heating fuel. At least two supports, axially spaced apart, are used to bear various loads of the gas turbine engine and its gearbox, for example, the gas turbine engine is mounted at its aft axial end and mounts to the gearbox at the forward axial end. The loads typically include vertical loads such as engine weight, axial loads due to engine generated thrust, and lateral and roll loads depending on the gas turbine engine's application.

Aft engine mounts typically are provided with a spring or other biasing member to provide a spring force to the engine in the vertical direction. However, spring loaded aft mounts have proved to behave inconsistently, with difficulty in variable spring forces (up to 1000 pounds), in provision of non-planar surfaces, and in maintaining consistent leveling. Because of deficient aft mounts, the engine cantilevers and causes gearbox misalignment with the engine. As a result, one or more gears within the gearbox experiences additional loading to cause excessive wear on the teeth. Hence, the gearboxes of engines with spring loaded aft mounts can be susceptible to failure due to the engine not being fully supported and/or excessive variability in engine position. Further, setup of spring loaded aft mounts by a technician can be highly variable.

U.S. Pat. No. 8,028,967 issued to Busekros et al shows a device and method for mounting a gas turbine engine. In particular, the disclosure of Busekros et al is directed to a gas turbine engine mounted on a base frame via a support. The support provides a support face in operational engagement with the base frame by way of a plurality of support plate elements. Changing the arrangement of only the support plates makes it possible to make later adjustments to the mounting of the gas turbine system in order to minimize vibration and bear the weight of the engine. A lifting device is provided to briefly raise the gas turbine engine such that the support plates' arrangement can be modified.

The present disclosure is directed toward overcoming known problems and/or problems discovered by the inventors.

SUMMARY OF THE DISCLOSURE

An alignment mount for a gas turbine engine is disclosed herein. The alignment mount includes an engine attachment configured to mechanically couple to the gas turbine engine, a ground attachment configured to mechanically couple to a ground, an expansion member mechanically coupled to the engine attachment and to the ground attachment, the expansion member configured to allow the engine attachment and the ground attachment to move relative to each other such that a length between can be varied, and a lock configured to prevent the engine attachment and the ground attachment from moving relative to each other such that the length between cannot be varied when the lock is engaged.

According to one embodiment, a system for aligning a gas turbine engine is also disclosed herein. The system includes a lifting device configured to lift the gas turbine engine via the engine attachment, a force determinator configured to measure an alignment mount reaction when the gas turbine engine is lifted by the lifting device, and an alignment indicator configured to represent feedback from the alignment mount reaction as an alignment condition. The system further includes an alignment mount comprising a engine attachment mechanically coupled to the gas turbine engine that only allows for axial growth of the engine, a ground attachment mechanically coupled to a ground, an expansion member mechanically coupled to the engine attachment and to the ground attachment, the expansion member configured to allow the engine attachment and the ground attachment to move relative to each other in a vertical direction, and a lock configured to prevent the engine attachment and the ground attachment from moving relative to each other in the vertical direction when the lock is engaged.

According to another embodiment, a method for aligning a gas turbine engine is also disclosed herein. The method includes installing an alignment mount, determining whether the gas turbine engine is aligned and/or in a sufficiently aligned condition including determining a downward force of the gas turbine engine on the alignment mount and correlating the downward force with an alignment condition, modifying a vertical position of the gas turbine engine at the alignment mount in response and reconfiguring an expansion member so as to allow an engine attachment and a ground attachment to move relative to each other in a vertical direction while providing a load path therebetween, and locking the expansion member against further reconfiguration.

DETAILED DESCRIPTION

The present disclosure relates to mounting and leveling a gas turbine engine. In particular, the present disclosure relates to an alignment mount and method of aligning a gas turbine engine coupled to a gearbox. Here, the gas turbine engine is mounted to a ground at one end, and mounted to the gearbox at the other end. If the gas turbine engine is not level it can become cantilevered and place stress on the gears and the gearbox, leading to lower performance of the gearbox. The present disclosure provides a solid mount that is adjustable and may include a load cell. The mount is adjusted until the reading from the load cell reaches a desired level.

Figure 1:
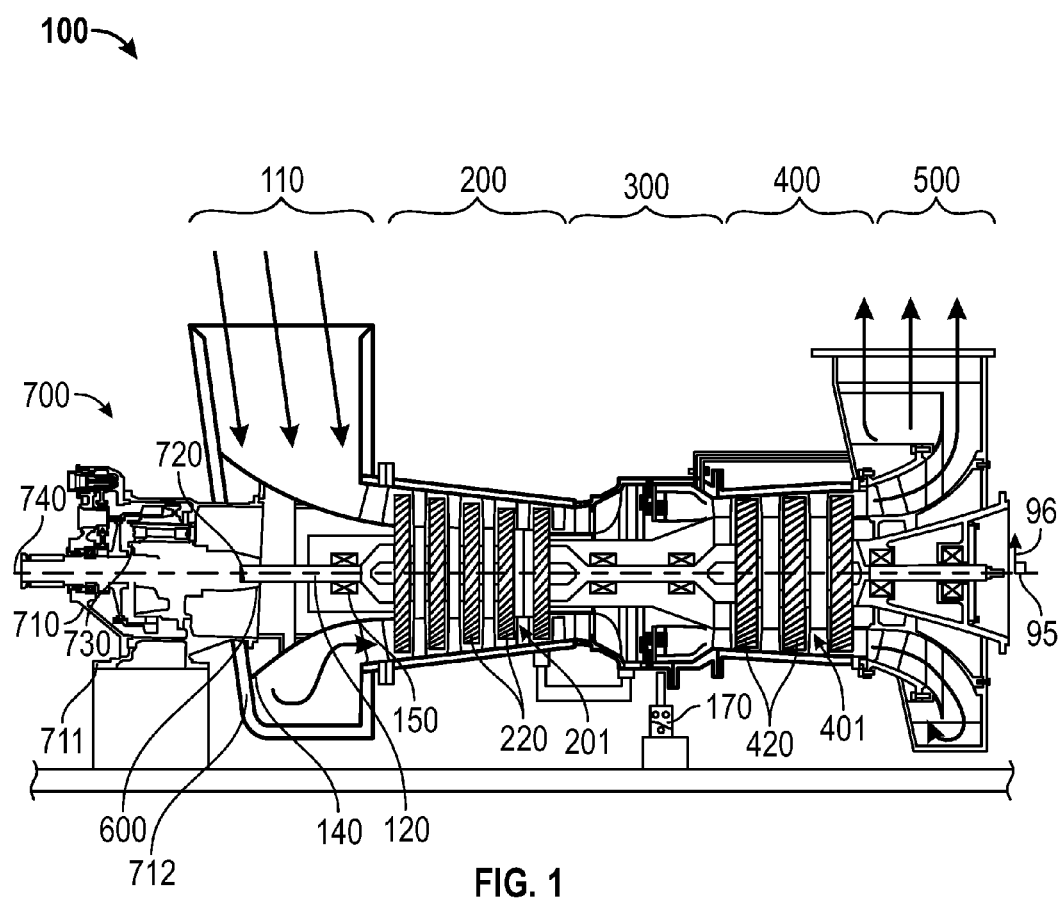
FIG. 1 is a schematic illustration of an exemplary gas turbine engine and a gearbox.

FIG. 1 is a schematic illustration of an exemplary gas turbine engine and a gearbox. Some of the surfaces have been left out or exaggerated (here and in other figures) for clarity and ease of explanation. Also, the exaggerated alignment lines have been included to illustrate the alignment of the gas turbine engine.

The present disclosure may use the gas turbine engine 100 for orientation purposes. In particular, the disclosure may reference a center axis 95 of rotation of the gas turbine engine 100, which may be generally defined by the longitudinal axis of its shaft 120. Thus, all references to radial, axial, and circumferential directions and measures refer to the center axis 95, unless specified otherwise, and terms such as "inner" and "outer" generally indicate a lesser or greater radial distance from the center axis 95, wherein a radial 96 may be in any direction perpendicular and radiating outward from center axis 95.

Generally, the gas turbine engine 100 includes an inlet 110, a shaft 120 (supported by bearings 150), a compressor 200, a combustor 300, a turbine 400, an exhaust 500, and a power output coupling 600. One or more sections may be coupled together at their housings via flanges. In addition, flanges may be provided for lifting and/or supporting one or more sections of the gas turbine engine 100.

The compressor 200 may include one or more rotating compressor rotor assemblies 220 populated with compressor blades, making up a compressor rotor 201. The turbine 400 includes one or more rotating turbine rotor assemblies 420 populated with turbine blades, making up a turbine rotor 401. The compressor rotor 201 and the turbine rotor 401 may rotate about the center axis 95.

The gas turbine engine 100 may be coupled to a gearbox 700. The gearbox 700 includes a power input coupling 720, drive gears 730, and a gearbox power output 740. The power input coupling 720 includes any convenient coupling mechanism (e.g., spline-to-receiver, flange-to-flange, etc.) and couples to the power output coupling 600 of the gas turbine engine 100. The drive gears 730 include any convenient gearing arrangement, and are generally configured to transmit power from the gas turbine engine 100 to the gearbox power output 740 at the desired torque and speed. The gearbox power output 740 can be used to drive one or more accessories (not shown), such as, for example, generators for electricity, pumps for circulating fluids, heat exchangers for cooling oil or heating fuel, any other accessories or combinations thereof known in the art.

The gearbox 700 also includes a gearbox housing 710 having a gearbox base mount 711 and a gas turbine engine interface 712. The gearbox housing 710 encloses the drive gears 730. The gearbox base mount 711 attaches to any convenient ground, supporting the gearbox 700. A ground may include any structural ground, base, or support structure, including but not limited to a gas turbine engine support platform. A ground may also include any intervening bracket, adapter, or other mounting interface. For convenience, reference made to a "support platform" hereinafter not limiting, but is understood to include any form of ground or intervening member.

The gas turbine engine interface 712 may include any convenient form or structure configured to couple with the gas turbine engine 100. In particular, the gas turbine engine interface 712 is configured to support a first end of the gas turbine engine 100 (i.e., the end proximate the gearbox 700), and transfer loading from the gas turbine engine 100 into the gearbox housing 710. For example, the gearbox housing 710 may mount to a bearing housing 140 via the gas turbine engine interface 712 and support a first end of the gas turbine engine 100 via the bearing housing 140. According to one embodiment, the first end of the gas turbine engine 100 may be the forward end (i.e., inlet side) of the gas turbine engine 100.

The gas turbine engine 100 is also supported at a second location by an alignment mount 170. In particular, the alignment mount 170 is configured to support a second end of the gas turbine engine 100 (i.e., the end distal from the gearbox 700), and transfer loading from the gas turbine engine 100 into any convenient support platform supporting the gas turbine engine 100. According to one embodiment, the alignment mount 170 may attach to a combustor case 310.

Accordingly, gas turbine engine 100 may be supported at at least two locations by the gearbox housing 710 and the alignment mount 170. Together, the gearbox base mount 711 and the alignment mount 170 may support weights greater than 8000 lbs (3629 kg). Furthermore, the gearbox housing 710 and the alignment mount 170 may hold and support the outer casing of the gas turbine engine 100, while the compressor rotor 201 and the turbine rotor 401 remain free to rotate and are supported by one or more shafts 120 by the bearings 150. As illustrated, the height of the alignment mount 170 the center axis 95 affects its alignment with the gearbox 700.

Figure 2:
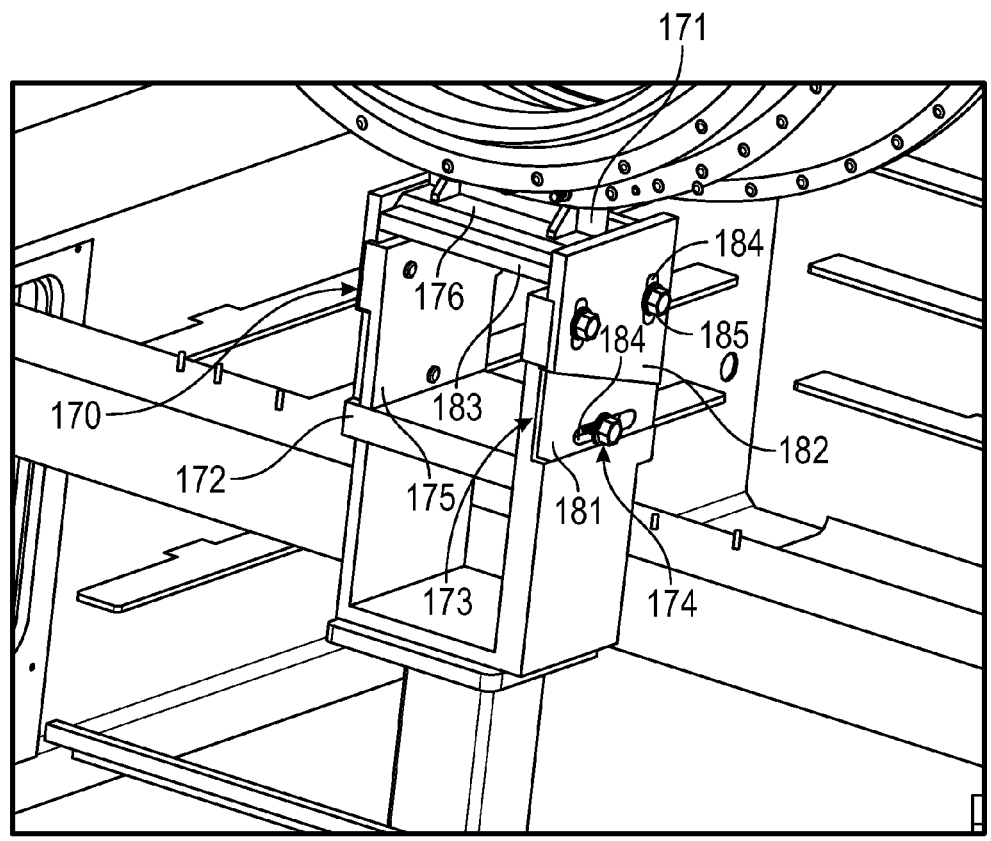
FIG. 2 is an isometric view of a system for aligning the gas turbine engine of FIG. 1.

FIG. 2 is an isometric view of an exemplary alignment mount for the gas turbine engine of FIG. 1. In particular, the alignment mount 170 is shown installed as an aft mount for the gas turbine engine 100. In addition, the alignment mount 170 is shown in its "locked" configuration subsequent to aligning the gas turbine engine. According to one embodiment, the alignment mount 170 may be variable in vertical length or height while in an "unlocked" configuration (i.e., during aligning), but otherwise fixed in height once in a "locked" configuration.

The alignment mount 170 may include an engine attachment 171, a ground attachment 172, an expansion member 173, and a lock 174. The engine attachment 171 and the ground attachment 172 are fixed to the gas turbine engine 100 and the support platform, respectively. The expansion member 173 may vary in height during alignment, and the lock 174 prevents further variation of the vertical length of the expansion member 173 once the lock 174 engaged. One or more components of the alignment mount 170 may be integrated with each other and/or their functionally may be distributed.

The engine attachment 171 may include any convenient attachment or adapter configured to join the gas turbine engine 100 to the alignment mount 170. In particular, the engine attachment 171 may be configured to mate with and/or mechanically couple to a receiving portion of the gas turbine engine 100. For example, the engine attachment 171 may include an adapter configured to fasten at one end to a support flange extending from the combustor case 310, and another end to the expansion member 173 and/or to an intervening part of the alignment mount 170.

The ground attachment 172 may include may include any convenient attachment or adapter configured to join the alignment mount 170 to a support platform or ground. As discussed above, the ground may include any base, structural ground, and or support structure. The ground attachment 172 is configured as a base for the alignment mount 170, and thus at least one part of the gas turbine engine 100. For example, the ground attachment 172 may include an adapter configured to fasten at one end to a gas turbine engine support platform, and another end to the expansion member 173 and/or an intervening part of the alignment mount 170.

The expansion member 173 may include one or more structural members configured to transfer loading from the engine attachment 171 to the ground attachment 172. In particular, the expansion member 173 is mechanically coupled to the engine attachment 171 and to the ground attachment 172, and is configured to fix the vertical length between the engine attachment 171 and the ground attachment 172 while locked. In addition, the expansion member 173 provides for the engine attachment 171 and the ground attachment 172 to move freely, relative to each other, in a vertical direction while unlocked.

The lock 174 may include may include one or more of any convenient locking mechanism, and is configured to fix the vertical length of the expansion member 173, and thus the vertical length of the alignment mount 170. Accordingly, the lock 174 is configured to prevent the engine attachment 171 and the ground attachment 172 from moving relative to each other in the vertical direction when the lock is engaged 174. Moreover, the lock 174 may have sufficient precision to lock the expansion member 173 within at least 0.125 inch (3.18 mm) of a desired vertical length. In addition, the lock 174 may be permanent, temporary, automatically engaged, and/or manually engaged. For example, the lock 174 may include welds, pins, shims, fasteners, leadscrews (e.g., having Acme or other trapezoidal thread forms), etc.

The alignment mount 170 may also include a support stand 175. In particular, the support stand 175 may be any convenient load bearing structure or structures configured to transfer loading from the engine attachment 171 to the ground attachment 172 while the expansion member 173 is in a retracted position (e.g., shortest vertical length) and/or the lock 174 is disengaged. For example, while the lock 174 is disengaged the weight of the gas turbine engine 100 may be initially supported by the support stand 175.

As illustrated, the support stand 175 may include two vertical load bearing members set apart sufficient distance to install lifting equipment as described further below. In particular, the two vertical load bearing members may be parallel to each other set apart so as to create a space or region therebetween for a jack interface 177. For example, two vertical load bearing members, along with additional load bearing members, may create an "open box" shape that provides the support stand 175 with both stability and access on at least one side for lifting equipment.

According to one embodiment the support stand 175 may have a minimum vertical length so as to set the retracted height of the alignment mount 170 to coincide with a minimum out-of-tolerance deflection of the gas turbine engine. In particular, the minimum vertical length of the support stand 175 may such that the center axis 95 is just below a lowest design tolerance limit when the alignment mount 170 is installed but the lock 174 the alignment mount 170 is not engaged. For example, the support stand 175 may have a minimum vertical length such that the height or vertical length of the alignment mount 170 is no more than 0.25 inch (6.4 mm) less that its design nominal value of the center axis 95.

As illustrated, the support stand 175 may be integrated with other components. In particular, the support stand 175 may be integrated into or form part of the functional features of one or more other components of the alignment mount 170. For example, as illustrated, the support stand 175 may form part of the ground attachment 172, extending vertically upward from the ground attachment 172 to a predetermined height. Alternately, the support stand 175 may extend vertically downward from the engine attachment 171 and/or the expansion member 173. In addition, the support stand 175 may be integrated into and/or form part of the functional features of the expansion member 173 and/or the lock 174.

According to one embodiment, the alignment mount 170 may be configured as a sliding wedge, where the expansion member 173 and the lock 174 may be integrated together such that at least a portion of the expansion member 173 serves as part of the locking mechanism. In particular, the expansion member 173 may be fragmented so as to have at least one wedge and at least one rider. Relative lateral motion between the wedge and the rider then causes relative vertical motion between the wedge and the rider while maintaining a vertical load path throughout.

For example, as illustrated, the expansion member 173 may be separated into a lower half including a lower wedge 181, and an upper half including an upper wedge 182. Here, both the lower wedge 181 and the upper wedge 182 include a wedge surface 187. Accordingly, either of the lower wedge 181 and the upper wedge 182 may be considered to the abovementioned "wedge" and/or "rider". According to one embodiment, the wedge surface 187 may include features to resist sliding along the wedge surface 187 (e.g., rough finish, fine locking teeth, etc.).

Here, the lower wedge 181 may include two vertically oriented support members supported by the ground attachment 172 at one end, and having a wedge surface 187 at the other end. The upper wedge 182 may also include two vertically oriented support members having a wedge surface 187 at the one end, which is vertically aligned with, and positioned above the mating wedge surface 187 of the lower wedge 181. In addition, two vertically oriented support members of the upper wedge 182 may be joined together by a landing platform 183. The landing platform 183 may be any structure joining the two members, and may further be configured to support the engine attachment 171.

Also for example, the lower wedge 181 and the upper wedge 182 may include one or more linear guides 184. In particular, the linear guides 184 limit motion of the lower wedge 181 and the upper wedge 182, respectively, and are orthogonal to each other. For example, the linear guides 184 may be embodied as one or more vertically-oriented guide slots in one half (e.g., the lower wedge 181) and one or more horizontally-oriented guide slots in the other half (e.g., the upper wedge 182). The guide slots may then receive a guiding member, such as a stud or bolt, configured to limit motion of the lower wedge 181 and the upper wedge 182 to that provided by the guide slot and the a guiding member. The guiding member may be fixed to another component, such as the ground attachment 172.

In the illustrated configuration, the lower wedge 181 is restricted to horizontal linear motion, while the upper wedge 182 is restricted to vertical linear motion by their linear guides 184. Moreover, when in contact with each other, a linear motion of the lower wedge 181 will induce an orthogonal linear motion in the upper wedge 182. For example, here, a horizontal motion of the lower wedge 181 will induce vertical motion of the upper wedge 182.

Also for example, the lock 174 may be integrated into the support stand 175. In particular, the support stand 175 may both be structurally part of and functionally part of the lock 174. As illustrated, the support stand 175 may be fixed to and extend from the ground attachment 172. Also as illustrated, the lock 174 may include fasteners 185 (e.g., machine screw) and a vertical portion of the support stand 175 (e.g., a vertical load bearing member) acting as a back plate. In the "unlocked" configuration (screws installed but loose), the lower wedge 181 and the upper wedge 182 remain free to move according to their respective linear guides 184. In the "locked" configuration the screws are tightened into the support stand 175 forming a friction lock, and preventing relative motion between the lower wedge 181 and the upper wedge 182.

According to one embodiment, the alignment mount 170 may also include an axial slide 176. The axial slide 176 may be any convenient mechanism configured to provide for axial growth of the gas turbine engine 100. The axial slide 176 may be interspersed between the engine attachment 171 and the expansion member 173, and may be configured to provide for thermal growth of the gas turbine engine 100. In particular, the axial slide 176 is configured to slide in the axial direction as the axial length of the gas turbine engine 100, and thus the axial location of the engine attachment 171, changes. For example, the axial slide 176 may be a lubricated shoe member mounted to the foot of the engine attachment 171. In addition, the shoe may include a guide 186 configured to limit the axial slide 176 to one degree of freedom. The axial slide 176 may be configured to slide axially, in either direction, responsive to thermal growth of the gas turbine engine 100, for example, where the gearbox is 700 is fixed to a support platform. According to one embodiment the axial slide 176 may be configured to provide a range of at least 0.5 inch (12.7 mm) linear displacement in the axial direction.

Moreover, the guide 186 may be further configured to limit the linear motion of the axial slide 176 to a predetermined range. For example, the guide 186 may include a vertical member, such as a pin or stud, that rides in a mating receiver (e.g., a slot in a horizontal member of the expansion member 173). The range may be just greater than a predetermined maximum travel range due to thermal growth. For example, the guide 186 may limit the linear motion of the axial slide 176 to a range of 0.5 inch (12.7 mm) linear displacement in the axial direction.

Figure 3:
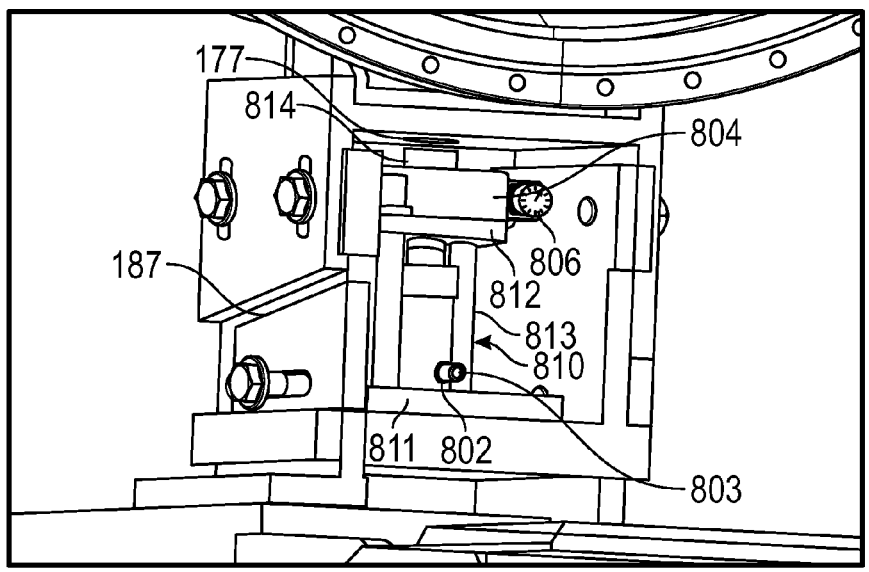
FIG. 3 is an isometric view of an exemplary alignment mount for the gas turbine engine of FIG. 1.

FIG. 3 is an isometric view of a system for aligning the gas turbine engine of FIG. 1. In particular, an alignment system 800 including the alignment mount 170 of FIG. 2, is shown. The alignment system 800, may be used to align the gas turbine engine 100. Here, the alignment mount 170 is installed as an aft mount, and is in its "unlocked" configuration, prior to aligning the gas turbine engine 100.

The alignment system 800 may include a lifting device 802, a force determinator 804, and an alignment indicator 806. In addition, alignment system 800 may include the alignment mount 170 described above. Together, the lifting device 802 is configured to lift the gas turbine engine 100 while the alignment mount 170 is installed but unlocked, and while a downward force is measured by the force determinator 804. Once a predetermined downward force is measured, the alignment mount 170 is locked.

The lifting device 802 may be any convenient mechanism configured to lift the gas turbine engine 100 at or about the location of the engine attachment 171. In particular, the lifting device 802 is configured precisely raise and/or lower the engine attachment 171, thus placing the gas turbine engine 100 in alignment with the gearbox 700. For example, the lifting device 802 may be a jack having at least an 8000 lbs (3629 kg) lifting capacity. Also for example, the lifting device 802 may be a 10 hydraulic ram.

The lifting device 802 may be hydraulically, mechanically, pneumatically, or electrically operated. In addition, lifting device 802 may be locally (e.g., within arms reach) or remotely (e.g., not locally) controlled. As illustrated, the lifting device 802 may also include an external power supply 803. Here, the lifting device 802 is configured as an electrically powered jack, where jack power and control is provided through its power supply 803.

According to one embodiment, the alignment mount 170 may also include a jack interface 177. Generally, the jack interface 177 includes a region of the alignment mount 170 that is vacated and/or otherwise configured to receive the lifting device 802 and/or other components of the alignment system 800. For example, the jack interface 177 may include the region between the vertical load bearing members of the support stand 175 discussed above. In particular, the jack interface 177 may include features configured to stabilize the base and/or the lifting surface of the jack. For example, the jack interface 177 may include a recessed or otherwise bounded area in the engine attachment 171, the ground attachment 172, and/or the expansion member 173, the recessed or otherwise bounded area configured to inhibit inadvertent lateral motion during lifting. Also for example, jack interface 177, may include a key and/or receptacle configured to couple with a mating receptacle and/or key of the lifting device 802, orienting and/or aligning the alignment mount 170 and the lifting device 802 with each other, during lifting for example.

Alternately, the lifting device 802 may be integrated into and form part of the alignment mount 170. In particular, the lifting device 802 may remain with the alignment mount 170 after the gas turbine engine 100 is aligned. Moreover, in this configuration, the lifting device 802 may also share with and/or incorporate features of the alignment mount 170. For example, the lifting device 802 may act as the support stand 175 of the alignment mount 170 (supporting engine weight prior to engine alignment) when the lifting device 802 is in a retracted position.

The force determinator 804 may include any convenient force measuring device. In particular, the force determinator 804 is configured to measure an alignment mount reaction (the downward force that is being supported by the engine attachment 171 of the alignment mount 170). For example, the force determinator 804 may measure a force at least 8000 lbs (3629 kg). Also for example the force determinator 804 may measure a force at least 18,000 lbs (8165 kg). Moreover, the force determinator 804 is configured to measure the alignment mount reaction with sufficient resolution to correlate to and measure alignment of the gas turbine engine 100. For example, the force determinator 804 may measure forces of at least 8000 lbs (3629 kg) with a resolution of at least 0.5 percent. Also for example, the force determinator 804 may be a low profile "pancake" type load cell having a 5 lb.-500,000 lb. (2.3 kg.-230,000 kg.) range with 0.1% accuracy.

According to one embodiment, the force determinator 804 may include a strain gauge such as found in a load cell or a calibrated spring scale. In particular, the force determinator 804 may include a strain gauge configured to measure deformation as an electrical signal, because the strain changes the effective electrical resistance of wires. The electrical signal can be carried by one or more conductors to a controller or other device configured to convert strain to force. It will be appreciated that the controller or other device can be implemented in hardware, software, and/or firmware.

According to one embodiment, the force determinator 804 may be located at least partially within the alignment mount 170. In particular, the force determinator 804 may be interspersed between the engine attachment 171 and the ground attachment 172. For example, the force determinator 804 may be a load cell located above and/or below the lifting device 802. However, other arrangements of force determinators can be used, such as, for example, placing a strain gauge directly on the engine unit to determine the load. It can be appreciated that other mechanisms can be used by persons of ordinary skill in the art to determine the load of the gas turbine engine 100.

According to one embodiment, the force determinator 804 may be at least partially integrated into the alignment mount 170. In particular, the force determinator 804, or a portion thereof (e.g., strain gauge), may be configured to remain fixed to the alignment mount 170 after alignment and during normal operation. For example, the force determinator 804 may be interspersed between the engine attachment 171 and the expansion member 173. Also for example, the force determinator 804 may be interspersed between the ground attachment 172 and the expansion member 173.

According to one embodiment, the force determinator 804 may be at least partially integrated into the lifting device 802. In particular, the force determinator 804, or a portion thereof, may be configured to remain fixed to the lifting device 802 after alignment as a single unit. For example, the force determinator 804 and the lifting device 802 may be attached together as an alignment tool 810. The alignment tool 810 may also include a tool base 811, a load cell pad 812, one or more linear travel guides 813, and an installation key 814. In this embodiment, the lifting device 802 and the linear travel guides 813 are attached to the tool base 811. The installation key 814 is attached to the force determinator 804. The force determinator 804 is attached to the load cell pad 812. The load cell pad 812 is slideably attached to the one or more linear travel guides 813.

The alignment indicator 806 may include any convenient human-machine-interface (HMI). In particular, the alignment indicator 806 is configured to represent feedback from the alignment mount reaction as an alignment condition or state. The alignment condition or state may be an ultimate determination of alignment and/or a correlated metric.

The alignment indicator 806 may also include hardware, coupling, electronics, etc. The alignment indicator 806 may visually, aurally, or otherwise indicate the force load and/or a conversion indicating engine alignment. For example, the alignment indicator 806 may include a digital or analog display. The display may numerically or otherwise indicate the force load and/or engine alignment feedback. Moreover, the alignment indicator 806 may represent a particular quantity of the feedback (e.g., force, displacement angle, displacement distance, percent alignment, etc.). Alternately, the alignment indicator 806 may represent an ultimate alignment state (e.g., "aligned", "not aligned", "high", "low", etc.).

The alignment indicator 806 may be located in a user-friendly location along with the controller for the lifting device 802, and configured accordingly. Moreover, the alignment indicator 806 may be local or remote to the alignment mount 170. For example, where a controller for the lifting device 802 is located locally, the alignment indicator 806 may be local to the alignment mount 170. To illustrate, the alignment indicator 806 may be configured as a display (or other indicator) attached to or nearby the force determinator 804, and perceivable while lifting the gas turbine engine 100.

Also for example, where the controller is located remotely, the alignment indicator 806 may be perceivable from the remote controller as well. To illustrate, the alignment indicator 806 may include a display (or other indicator) nearby the alignment mount 170, but the feedback presentation may be viewable/perceivable from the location of the controller. Alternately, the alignment indicator 806 may also be located remotely, such as a part of a handheld device or part of a user terminal. In this case, the alignment indicator 806 is communicably coupled to the force determinator 804. The couple may be a wired, wireless, optical, or other couple.

According to one embodiment, the alignment system 800 may further include a removable support stand 808. In particular, the removable support stand 808 may be any convenient load bearing structure or structures configured to transfer loading from the engine attachment 171 to the ground attachment 172 while the expansion member 173 is in a retracted position and/or the lock 174 is disengaged. In addition, the removable support stand 808 may be removed from the alignment mount 170 after its lock 174 is engaged and engine weight is supported by the alignment mount 170. According to one embodiment, the support stand 175 may have a minimum vertical length (as with the support stand 175 of the alignment mount 170) so as to set the retracted height of the alignment mount 170 to coincide with a minimum out-of-tolerance deflection of the gas turbine engine 100 (e.g., measured along shaft 120).

According to one embodiment, the removable support stand 808 may be integrated with one or more other components or features of the alignment system 800. In particular, the removable support stand 808 may be integrated with the alignment tool 810 as a single unit. For example, removable support stand 808 may include at least two vertical load bearing members, joined to the tool base 811.

INDUSTRIAL APPLICABILITY

The present disclosure generally applies to gas turbine engine mounts, and gas turbine engines having gas turbine engine mounts. The described embodiments are not limited to use in conjunction with a particular type of gas turbine engine, but rather may be applied to stationary or motive gas turbine engines, or any variant thereof. The described embodiments may be applied to engine stands, testing stands, and testing facilities. Gas turbine engines, and thus their components, may be suited for any number of industrial applications, such as, but not limited to, various aspects of the oil and natural gas industry (including include transmission, gathering, storage, withdrawal, and lifting of oil and natural gas), power generation industry, aerospace and transportation industry, to name a few examples.

More particularly, the present disclosure relates to mounting and leveling a gas turbine engine, and in particular, one with a gearbox. When the turbine engine is not level or in alignment with the gearbox, the gas turbine engine can become cantilevered, resulting in deflection of greater than, for example, about 0.0003 inch/inch (0.0076 mm/mm) relative to the center axis 95, and additional stress placed on and misalignment of the gearbox components, which may lead to wear and lowered performance.

Figure 4:
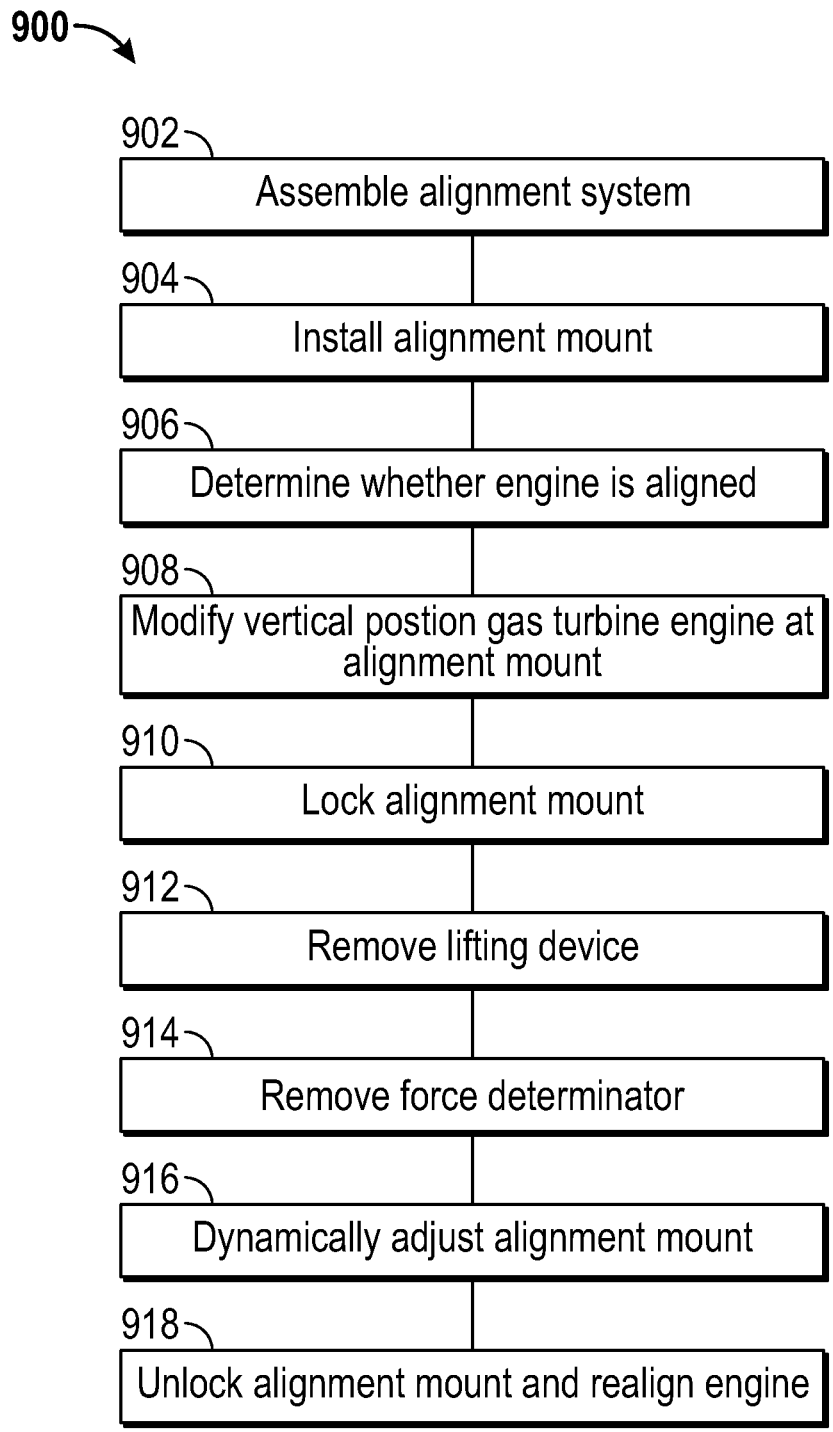
FIG. 4 is a flow chart of an exemplary method for aligning the gas turbine engine of FIG. 1.

FIG. 4 is a flow chart of an exemplary method for aligning the gas turbine engine of FIG. 1. The gas turbine engine portion can be substantially aligned with the gearbox portion of the engine unit about an axial axis with one or more of the following steps of a method 900, with reference to FIG. 1-3. The steps of method 900 may be performed in the order presented or out of the order presented. In addition, the steps of method 900 may be performed in parts. For example, one step may be performed in part, followed by one or more subsequent steps, and then completed.

In step 902, the alignment system 800 is assembled. In particular, the lifting device 802, the force determinator 804, and the alignment indicator 806, are operably combined with the alignment mount 170, where applicable. For example, the lifting device 802, the force determinator 804, and the alignment indicator 806 may be attached to, placed in, or otherwise configured to perform the steps described below. Also for example, the alignment tool 810, including the lifting device 802, the force determinator 804, and the alignment indicator 806 may be placed in a region of the alignment mount 170 that is vacated and/or otherwise configured to receive the alignment tool 810.

In step 904, the alignment mount is installed. Installing the alignment mount 170 may include attaching the alignment mount 170 to the gas turbine engine, attaching the alignment mount 170 to a support platform, and assuring that the expansion member 173 of the alignment mount 170 is in an unlocked configuration. As discussed above, the "support platform" is broadly defined. In step 904, the alignment mount 170 may be installed in an "unlocked" configuration. According to one embodiment, step 902 may be performed or completed after the alignment mount 170 is installed.

In step 906, a determination of whether the gas turbine engine is aligned and/or in a sufficiently aligned condition is made. In particular, a downward force of the gas turbine engine on the alignment mount is determined and correlated with an alignment condition. For example, the downward force may be measured using the force determinator 804 and compared against a desired downward force or range, which corresponds to a sufficiently aligned condition. Also for example, an electric signal indicative of the force can be sent to a processor and displayed numerically by the alignment indicator 806, such as on a local display or remote display.

In comparing the measured downward force versus the desired downward force or range, the alignment indicator 806 may be used by an operator to determine whether the gas turbine engine is sufficiently aligned, based on force measurements. Alternately, the comparison may be performed by a machine, the machine configured to determine an ultimate alignment state and represent with the alignment condition to the operator via the alignment indicator 806.

Determining whether the gas turbine engine is in a sufficiently aligned condition may include correlating the measured downward force to a misalignment or a deflection of less than, for example, about 0.0003 inch/inch (0.0076 mm/mm) relative to the center axis 95. Alternately, determining whether the gas turbine engine is in a sufficiently aligned condition may include correlating the measured downward force to a misalignment from the center axis or a deflection of less than, for example, about 0.0001 inch/inch (0.0025 mm/mm) relative to the center axis 95. Alternately, determining whether the gas turbine engine is in a sufficiently aligned condition may include measuring a downward force within 0.5% of a predetermined downward force or range representing an aligned and/or sufficiently aligned condition. Alternately, determining whether the gas turbine engine is in a sufficiently aligned condition may include measuring a downward force within 100 lbs (45.4 kg) of a predetermined downward force or range representing an aligned and/or sufficiently aligned condition.

In step 908, the vertical position of the gas turbine engine at the alignment mount is modified in response to the alignment condition. In particular, the engine attachment 171 may be raised or lowered to bring the gas turbine engine within a sufficiently aligned condition while the expansion member 173 is reconfigured so as to allow the engine attachment 171 and the ground attachment 172 to move relative to each other in a vertical direction while providing a load path between the engine attachment 171 and the ground attachment 172 through the expansion member 173. For example an operator may control the lifting device 802 so as to raise or lower the engine attachment 171 as desired. Alternately, the vertical position the gas turbine engine at the alignment mount may be modified relative to the gearbox by raising or lowering the vertical position of the gearbox.

In step 910, the alignment mount 170 is locked. In particular, the expansion member 173 or other vertically adjustable member is prevented from further vertical adjustment. For example, in the illustrated configuration of lock 174, upper and lower wedges 181, 182 may be slid into contact, along their guide slots, and one or more fasteners 185 may be tightened so as to lock the upper and lower wedges 181, 182 in place. Also for example, the upper and lower wedges 181, 182 may be welded, pinned, or otherwise prevented from relative movement. Also for example, additional locking mechanisms may be used alone or in combination, such as shimming the alignment mount 170 to prevent retraction from its aligned vertical length.

After the desired adjustments are made and the alignment mount 170 is locked, one or more components of the alignment system 800 may be removed. In particular, in step 912, the lifting device 802 may be removed from the alignment mount 170. For example, a jack may be retracted and removed from the alignment mount 170. In step 914, the force determinator 804 may be removed from the alignment mount 170. For example, a load cell may be decoupled and removed from the alignment mount 170. According to one embodiment, an alignment tool 810, including both the lifting device 802 and the force determinator 804, may be collapsed and pulled from the alignment mount 170 as a single unit.

In step 916, the alignment mount 170 is adjusted dynamically. In particular, at least one of the force load and the vertical length of the alignment mount 170 can be adjusted to substantially align the gearbox portion and the engine portion relative to the center axis 95, and in particular, to achieve alignment during an engine running condition where thermal growth of the gas turbine engine 100 may occur.

The gas turbine engine 100 has an initial force load at an engine rest condition. The force load may adjust to a specified force load at an engine running condition. The gas turbine engine 100 may have a variable force load during the engine running condition between a minimum running condition and a maximum running condition. The force load of the gas turbine engine 100 may be monitored with the force determinator 804 between the minimum running condition and the maximum running condition. The gas turbine engine 100 may have a maximum force load at the maximum running condition. The axial length of the alignment mount 170 can be adjusted to a length to correspond to the maximum force load.

In one example, during the engine rest condition, the force determinator 804 may be preset to a force load for the engine running condition based on the gearbox flange datum, engine weight and center of gravity and aft mounting, center of gravity of the gearbox, and other factors. Based on the preset force load, the alignment mount 170 may have a preset length for the engine running condition. A differential distance to change the preset length of the alignment mount 170 can be determined, (e.g., based on experimental data). For example, a test can be conducted to determine the amount of force on the alignment mount 170 per change in unit length of the alignment mount 170 by measuring thermal growth using a dial gauge or calculated thermal growth based on measured temperatures.

The length of the alignment mount 170 can be changed by the differential distance to a subsequent length such that during the engine rest condition there can be predesigned misalignment between the engine portion and the gearbox portion. To this end, when the gas turbine engine 100 is at its engine running condition and thermal expansion is allowed to occur, the alignment mount 170 at its subsequent length can accommodate for radial and axial expansion changes of the gas turbine engine 100. The alignment mount 170 at its subsequent length can be sufficient to permit substantially alignment between the gearbox portion and the engine portion about the center axis 95. According to one embodiment, the dynamic adjustment may be accomplished via the axial slide 176 discussed above, or other features providing for horizontal or axial movement. The dynamic adjustment may be a passive reaction to axial forces transmitted from the gas turbine engine 100 into the engine attachment 171, or an active response to an adjustment by an operator.

In another example, during the engine rest condition, the length of the alignment mount 170 may be preset to a length (vertical and/or horizontal) for the engine running condition based on the gearbox flange datum, engine weight and center of gravity and aft mounting, center of gravity of the gearbox, and other factors. From the preset length, the alignment mount 170 may have a preset downward force load for the engine running condition based on the preset length. A differential force load to change the preset force load of the alignment mount 170 can be dynamically determined as above. Then, the downward force load or height of the alignment mount 170 can be changed by the differential load to a subsequent downward force load such that during the engine rest condition there can be predesigned misalignment between the engine portion and the gearbox portion. For example, the force determinator 804 can be adjusted. To this end, when the gas turbine engine 100 is at its engine running condition and thermal expansion is allowed to occur, the alignment mount 170 at its subsequent force load can accommodate for radial and axial expansion changes. The alignment mount 170 at its subsequent force can be sufficient to permit substantial and/or increased alignment between the gearbox portion and the engine portion about the center axis 95.

In step 918, the alignment mount 170 is unlocked and the gas turbine engine is realigned. In particular and including one or more steps above, the lock 174 may be disengaged and the gas turbine engine may be realigned with the lifting device 802. Step 918 may be initiated in response to a dynamic condition and/or a predetermined condition. For example, the alignment mount 170 may be realigned responsive to a measurement of the force determinator (dynamic condition), a measurement of gearbox alignment sensor or engine performance measure (dynamic condition), preventative or scheduled maintenance (predetermined condition), aging correction (predetermined condition).

Generally, embodiments of the presently disclosed alignment mount and system for aligning a gas turbine engine are applicable to the installation, test, use, operation, maintenance, repair, and improvement of gas turbine engines, and may be used in order to improve performance, life, and efficiency, decrease maintenance and repair, and/or lower costs. In addition, embodiments of the presently disclosed system for aligning a gas turbine engine may be applicable at any stage of the gas turbine engine's life, from design to prototyping and first manufacture, and onward to end of life. Accordingly, the system for aligning a gas turbine engine may be used as part of a retrofit or enhancement to existing gas turbine engine, as a preventative measure, or even in response to an event. This is particularly true as the presently disclosed alignment mount may conveniently include identical interfaces to be interchangeable with an earlier type of gas turbine engine mounts.

More particularly, the present disclosure can provide a rigid (without a base spring) alignment mount that may be adjustable, and may include a force determinator device such as a strain gauge. The alignment mount can be adjusted until a reading from the load cell reaches a desired level sufficient to inhibit cantilevering, for example, up to about 0.0001 inch/inch (0.0025 mm/mm) relative to the center axis 95.

The alignment mount can also inhibit gearbox wear, underperformance, and failure, especially caused by axial and radial thermal expansion and contraction of the gas turbine engine unit during engine running condition, which can account for axial movement of greater than about 0.2 inches (5.1 mm), and for radial movement of greater than about 0.12 inches (3.0 mm). The alignment mount and system for aligning a gas turbine engine can provide more consistent and accurate force loading and bearing for an engine unit. Further, the alignment mount may avoid the manual, arbitrary, and inconsistent setup performed by technicians, thereby reducing setup time and failure.

The preceding detailed description is merely exemplary in nature and is not intended to limit the invention or the application and uses of the invention. The described embodiments are not limited to use in conjunction with a particular type of gas turbine engine. Hence, although the present embodiments are, for convenience of explanation, depicted and described as being implemented in a stationary gas turbine engine, it will be appreciated that it can be implemented in various other types of gas turbine engines, and in various other systems and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A method for aligning a gas turbine engine, the method comprising:
    installing an alignment mount, including attaching the alignment mount to the gas turbine engine, attaching the alignment mount to a support platform, and assuring that an expansion member of the alignment mount is in an unlocked configuration;
    assembling an alignment system, including operably combining a lifting device with the alignment mount;
    determining whether the gas turbine engine is in a sufficiently aligned condition including determining a downward force of the gas turbine engine on the alignment mount and correlating the downward force with an alignment condition;
    modifying a vertical position of the gas turbine engine at the alignment mount with the lifting device and in response to the determining whether the gas turbine engine is in a sufficiently aligned condition, the modifying a vertical position of the gas turbine engine including reconfiguring the expansion member so as to allow an engine attachment and a ground attachment to move relative to each other in a vertical direction while providing a load path between the engine attachment and the ground attachment through the expansion member;
    locking the expansion member against further reconfiguration; and
    removing the lifting device from the alignment mount after the locking the expansion member.

2. The method of claim 1, wherein the assembling the alignment system, includes operably combining a force determinator with the alignment mount before the modifying the vertical position of the gas turbine engine at the alignment mount, the method further comprising removing the force determinator from the alignment mount after the locking the expansion member.

3. The method of claim 1, further comprising dynamically adjusting the alignment mount in an axial direction via an axial slide during operation of the gas turbine engine.

4. The method of claim 1, further comprising unlocking the alignment mount and realigning the gas turbine engine in response to a dynamic or a predetermined condition; and
    wherein realigning the gas turbine engine includes determining whether the gas turbine engine is still in a sufficiently aligned condition and modifying the vertical position of the gas turbine engine at the alignment mount in response to the determining whether the gas turbine engine is still in the sufficiently aligned condition.

5. An alignment mount for a gas turbine engine, the alignment mount comprising:
an engine attachment configured to mechanically couple to the gas turbine engine;
a ground attachment configured to mechanically couple to a support platform;
an expansion member coupled to the engine attachment and to the ground attachment and comprising a lower half and an upper half, the lower half including a lower wedge, and the upper half including an upper wedge, the expansion member configured to fix a vertical length and provide a load path between the engine attachment and the ground attachment while locked, the expansion member further configured to allow the engine attachment and the ground attachment to move freely, relative to each other, while unlocked, and such that a length between can be varied, the upper wedge is configured to come into contact with a wedge surface of the lower wedge, forming a load path at the wedge surface and the lower wedge and the upper wedge are further configured such that linear motion of the lower wedge will require an orthogonal linear motion in the upper wedge when the lower wedge and the upper wedge are in contact;
a lock configured to lock the expansion member when engaged and to unlock the expansion member when disengaged; and
a support stand, the support stand configured to transfer loads from the engine attachment to the ground attachment while the lock is disengaged.

6. The alignment mount of claim 5, wherein the lock is integrated into the expansion member and support stand, the lock configured to engage by fixing the lower wedge to the support stand and the upper wedge to the support stand, the support stand configured to prevent the fixed lower wedge and upper wedge from moving relative to each other when the lock is engaged.

7. The alignment mount of claim 5, further comprising an axial slide, the axial slide configured to provide the engine attachment with a linear displacement of 12.7 mm in the axial direction, relative to the gas turbine engine, when the alignment mount is installed and while the lock is engaged.

8. The alignment mount of claim 5, wherein the engine attachment is configured to attach to a combustor flange of the gas turbine engine; and
wherein the ground attachment is configured to attach to a support platform of the gas turbine engine.

9. The alignment mount of claim 5, wherein the alignment mount is configured to support 3629 kg when installed, and while the lock is disengaged.

10. The alignment mount of claim 5, further comprising a force determinator configured to measure an alignment mount reaction of 3629 kilograms with a resolution of at least 0.5 percent.

11. A system for aligning a gas turbine engine, the system comprising:
a lifting device configured to lift the gas turbine engine via an engine attachment;
a force determinator configured to measure an alignment mount reaction when the gas turbine engine is lifted by the lifting device;
an alignment indicator configured to represent feedback from the alignment mount reaction as an alignment condition; and
an alignment mount including
the engine attachment coupled to the gas turbine engine,
a ground attachment coupled to a support platform,
an expansion member coupled to the engine attachment and to the ground attachment, the expansion member configured to allow the engine attachment and the ground attachment to move relative to each other in a vertical direction,
a lock configured to prevent the engine attachment and the ground attachment from moving relative to each other in the vertical direction when the lock is engaged;
a support stand, the support stand configured to transfer loads from the engine attachment to the ground attachment while the lock is disengaged;
an axial slide, the axial slide interspersed between the engine attachment and the expansion member, the axial slide configured to provide for thermal growth of the gas turbine engine when the alignment mount is installed and while the lock is engaged;
wherein the expansion member is separated into a lower half and an upper half, the lower half including a lower wedge, and the upper half including an upper wedge;
wherein when the upper wedge is configured to come into contact with a wedge surface of the lower wedge, forming a load path at the wedge surface;
wherein the lower wedge and the upper wedge are further configured such that linear motion of the lower wedge will require an orthogonal linear motion in the upper wedge when the lower wedge and the upper wedge are in contact; and
wherein the lock is integrated into the expansion member and support stand, the lock configured to engage by fixing the lower wedge to the support stand and the upper wedge to the support stand, the support stand configured to prevent the fixed lower wedge and upper wedge from moving relative to each other when the lock is engaged.

12. The system of claim 11, wherein the lifting device is configured to lift the gas turbine engine while the lifting device and the force determinator are between the engine attachment and the ground attachment.

13. The system of claim 12, wherein the lifting device and the force determinator are coupled together as an alignment tool, the alignment tool configured to be removed from between the engine attachment and the ground attachment when the lock is engaged.

14. The system of claim 13, wherein the alignment tool includes a tool base, a load cell pad, a linear travel guide, and an installation key; and
wherein the lifting device and the linear travel guide are attached to the tool base, the installation key is attached to the force determinator, the force determinator is attached to the load cell pad, the load cell pad is slideably attached to the linear travel guide.

15. The system of claim 11, wherein the alignment mount is configured to support 3629 kg when installed, and while the lock is disengaged; and
wherein the force determinator is configured to measure an alignment mount reaction of 3629 kilograms with a resolution of at least 0.5 percent.

16. The system of claim 11, wherein the gas turbine engine is supported by a gearbox.

* * * * *